US006707475B1

(12) United States Patent
Snyder

(10) Patent No.: US 6,707,475 B1
(45) Date of Patent: Mar. 16, 2004

(54) SYSTEM FOR SELECTING AND DISPLAYING FLIGHT MANAGEMENT SYSTEM PROCEDURES

(75) Inventor: Mark I. Snyder, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 365 days.

(21) Appl. No.: 09/680,586

(22) Filed: Oct. 6, 2000

Related U.S. Application Data

(60) Provisional application No. 60/233,825, filed on Sep. 19, 2000.

(51) Int. Cl.[7] ............................................... G09G 5/00
(52) U.S. Cl. ................. 345/771; 345/823; 345/841; 345/854; 345/902; 701/1; 701/14
(58) Field of Search ................. 345/700, 854, 345/902, 841, 810, 823; 701/10, 11, 14–16, 3, 4, 8, 9; 340/945, 947

(56) References Cited

U.S. PATENT DOCUMENTS

| 4,086,632 | A |   | 4/1978  | Lions          |         |
|-----------|---|---|---------|----------------|---------|
| 5,025,382 | A |   | 6/1991  | Artz           |         |
| 5,340,061 | A |   | 8/1994  | Vaquier        |         |
| 5,901,062 | A | * | 5/1999  | Burch et al.   | 703/2   |
| 5,931,874 | A |   | 8/1999  | Ebert et al.   |         |
| 6,104,969 | A |   | 8/2000  | Beeks          |         |
| 6,112,141 | A |   | 8/2000  | Briffe et al.  |         |
| 6,317,659 | B1| * | 11/2001 | Lindsley et al.| 701/1   |
| 6,466,235 | B1| * | 10/2002 | Smith et al.   | 345/771 |
| 6,512,527 | B1| * | 1/2003  | Barber et al.  | 345/764 |

FOREIGN PATENT DOCUMENTS

| EP | 0 763 714 A2 | 3/1997  |
| EP | 0763714 A    | 3/1997  |
| WO | WO 97/41495  | 11/1997 |

OTHER PUBLICATIONS

Examiners Automated Search Tool, Version 1.03.0002, Copyright © 1999.*

* cited by examiner

Primary Examiner—Kristine Kincaid
Assistant Examiner—Gary Nguyen

(57) ABSTRACT

A system, method and device for selecting and displaying navigational information is presented which displays navigational procedures and/or options, allows for selecting and deselecting the procedures and/or options, and allows for generating a predetermined set of navigational procedures and/or options based upon the previous selection of navigational procedures and/or options. The system, method and device provide a more efficient and intuitive method for planning and programming a navigational path with special emphasis on facilitating the planning and programming of a phase of arrival for the flight path of an aircraft.

17 Claims, 3 Drawing Sheets

SYSTEM FOR SELECTING AND DISPLAYING FLIGHT MANAGEMENT SYSTEM PROCEDURES

REFERENCE TO RELATED APPLICATION

This application claims priority from and the benefit of U.S. Provisional Patent Application Serial No. 60/233,825, filed Sep. 19, 2000, the entire contents of which are hereby incorporated by reference.

BACKGROUND OF THE INVENTION

1. Technical Field

The present invention generally relates to a system, method and device for selecting and displaying procedures or information relating to a flight management system (FMS). More particularly, the present invention relates to an efficient system, method and device for selecting and displaying navigational information relating to the arrival and departure phases of an aircraft.

2. Background Information

A variety of instrumentation is included in the cockpits of military, commercial and private aircraft. Some of these cockpit instruments include flight computers, Primary Flight Displays (PFD), radios, gauges, and an instrument known as a Flight Management System (FMS) which assists a pilot in building and mapping out a flight plan by formatting navigation data and forwarding that data to a display system for real time display during a flight. The FMS navigation data can include waypoints, distances and headings between waypoints, airports and navaids. The latitude and longitude of the various waypoints, airports, and navaids are programmed into the FMS computer prior to flight in order to chart a portion of an aircraft's intended course.

A conventional FMS display 10 is shown in prior art FIG. 1 and illustrates various waypoints 12 plotted along a course from an origination point A to a destination point B. A triangle symbol is used to represent each waypoint 12, which has an associated latitude and longitude, which are abbreviated as LAT and LNG. A line interconnects the various waypoint symbols 12, and may be further identified with a distance in nautical miles, as well as a heading in degrees between the associated waypoints. The autopilot may fly the aircraft from point to point based on the latitude and longitude points of the waypoints. Alternatively, the pilot may manually fly the aircraft the intended distance at the identified heading along the charted course.

However, without programming a flight arrival phase, the flight plan remains programmed to fly the aircraft to the destination airport and, in particular, the control tower at that destination airport. Therefore, in order to get to the endpoint of an intended approach, the pilot programs the arrival phase of the flight plan by selecting the arrival and approach, the landing configuration, and the landing data. The selection of the arrival and approach includes the selection of a runway and the selection of an approach. In addition, depending upon the location of the aircraft, a transition and arrival route may also need to be selected and programmed by the pilot. Once the arrival phase is programmed, it will be inserted into the existing flight plan and the waypoint list will change to add all of the arrival waypoints.

The continued advancement in the sophistication of aircraft flight displays has resulted in increasingly higher levels of information density which has presented a greater amount of visual information to be perceived and understood by the operator. In many applications, it is important that visual displays provide a proper cognitive mapping between what the operator is trying to achieve and the information available to accomplish the task. As a result, such systems increasingly utilize the human-factor design principles in order to build instrumentation and controls that work cooperatively with human operators. More particularly, Title 14 of the U.S. Code of Federal Regulations, Federal Aviation Regulations (FAR) Part 25, Sec. 25.1321 et seq. provides guidelines for the arrangement and visibility of instruments, warning lights, indicators, and the like. Similarly, detailed guidelines related to electronics displays can be found in FAA Advisory circular 20-88A, *Guidelines on the Marking of Aircraft Powerplant Instruments* (September 1985).

Current arrival phase programming of the FMS involves multiple pages of information which must be switched back and forth depending upon the programming and changes in programming of the arrival phase of the flight plan during flight. This format requires the pilot to access, scan and assimilate several pages of flight arrival information and procedures in order to program in and change the arrival phase of the flight plan. As a result, it may be difficult for a pilot to locate, assimilate and program the arrival phase information and procedures if flight conditions are difficult.

Accordingly, systems and methods for programming FMS procedures, and especially those that relate to the flight arrival phase of the flight plan, are needed which are more efficient, more intuitive, and easier to use for the pilot.

SUMMARY OF THE INVENTION

The present invention is directed to a system for selecting and displaying FMS information and procedure categories which have a plurality of options available in each category. The system includes a display means for displaying the FMS information and procedure categories wherein each category includes a plurality of options for selection, a selection means for selecting and deselecting the options, and a processor configured to generate a predetermined set of options for viewing within each category when an option in any one category is selected or deselected. Further, in order to arrive at the predetermined sets of options after the selection or deselection of any one option, the processor must have access to a database of information relating to any landing sites which the aircraft intends to utilize. Accordingly, the predetermined sets of options which are generated are done so with reference to a selected landing site.

In another aspect of the present invention, a means for scrolling through the predetermined sets of options is provided so that a pilot can more easily carry out continued selections and/or deselections of single options, the selection or deselection of which continues to result in one or more regenerated sets of options thereby providing interactive feedback to the pilot.

It is an object of the present invention to provide a pilot with a more efficient, more intuitive, and easier to use system and method for selecting and displaying FMS information and/or procedures with particular emphasis on the FMS data and procedures which relate to the arrival and departure phases of an aircraft.

In one exemplary embodiment of the present invention, an FMS display device for displaying the arrival or departure phases of an aircraft is presented which includes means for selecting and deselecting a navigational choice within a navigational category. One example of the device includes, but is not limited to, a device where the means for selection may include a cursor control device, the navigational categories may include FMS procedures associated with the arrival phase of a flight plan, and the navigational options may include various options for carrying out the FMS procedure associated with a given navigational category. For example, the navigational categories may relate to the arrival phase of an aircraft's flight plan and could therefore include such FMS procedures such as selecting a runway, selecting an approach, selecting a start position, selecting a transition, and selecting an arrival route. The navigational options would relate to options for each of those categories. For example, the options listed under the FMS procedure category for selecting a runway may include several different numbered runways that are associated with a given landing site or airport.

Further, in one exemplary embodiment of the method of the present invention for selecting and displaying navigational information, a series of scrollable display areas for a set of navigational categories may be viewed on an overall display area where navigational options for each navigational category are listed within the display area for that category and the navigational options in any given category may be scrolled through in order to make a selection. After a selection is made, a predetermined set of options for one or more categories will automatically be displayed as a result of selecting or deselecting an option. For further clarification, the steps for selecting and displaying navigational information relating to the arrival phase of an aircraft's flight plan will be described below.

First, a user selects a runway option under the runway category such as runway 08L, for example, which means that the user has selected the left-hand side of runway 8 of that airport which represents the arrival destination. The selection may be made by way of actuating a cursor control device capable of moving a cursor across the options selections, or highlighting the options selections, and then clicking the device to select the designated or highlighted option. In another aspect of the present invention, the selection may also be made by way of a keyboard using the directional areas of the keyboard for highlighting option selections. Once the user selects the runway option from the runway category, the other runway options which were not selected are automatically removed from the display area and other options relating to other procedures for mapping the arrival phase of the aircraft's flight plan are automatically presented. The automatically presented options are predetermined based upon the remaining procedures for flight arrival that are still available as a result of selecting a specific runway of the destination airport. For example, the display area for the runway category will only show runway 08L and the display area for selecting the type of approach will only show those approaches that are available for runway 08L of the destination airport. Moreover, display areas for other categories (such as, for example, start position for descent, transition, and arrival route) may also automatically present a set of predetermined options that are available for that category given the selections that have been made in other categories thus far.

Next, the pilot scrolls though the options now available under the approach category and selects a specific approach type of such as, for example, Instrument Landing System (ILS). The ILS approach utilizes a localized guide slope which guides you to the airport both laterally and vertically. Once the approach option is selected, predetermined sets of options are generated based upon the options chosen in other categories thus far and are then automatically displayed. Alternatively, if the pilot changes his mind about the approach, he can simply deselect the approach and the predetermined list of options that existed before that selection will be redisplayed. The continued process of selecting an option in each of the navigational categories is repeated until all necessary information has been programmed into the computer to carry out the complete arrival phase of the aircraft.

It should be understood that both the foregoing general description and the following detailed description are exemplary and explanatory and are intended to provide further explanation of the claimed invention.

BRIEF DESCRIPTION OF EXEMPLARY DRAWING FIGURES

A more complete understanding of the present invention may be derived by referring to the following detailed description and claims when considered in connection with the following illustrative figures where like numerals denote like elements.

Figure 4:
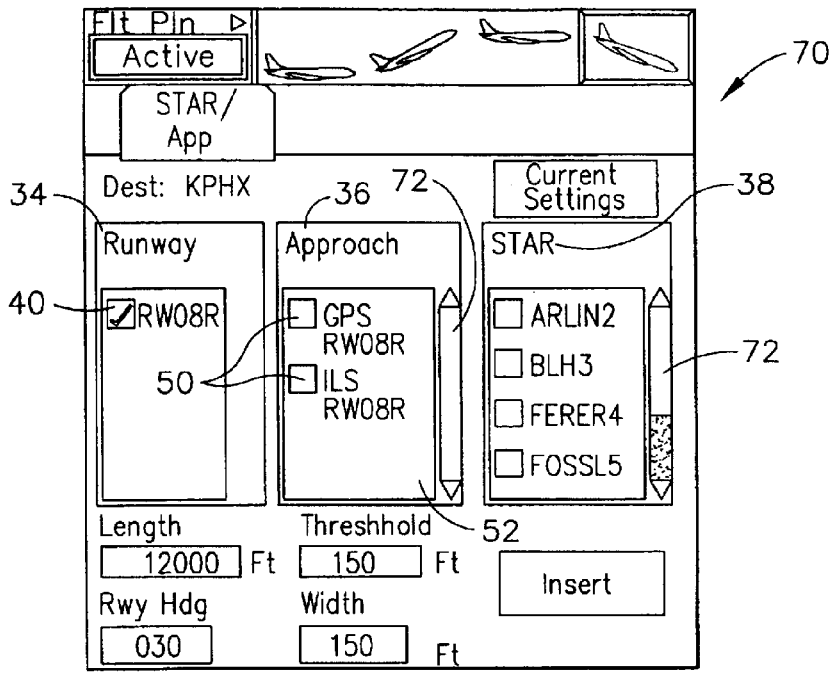
Figure 5:
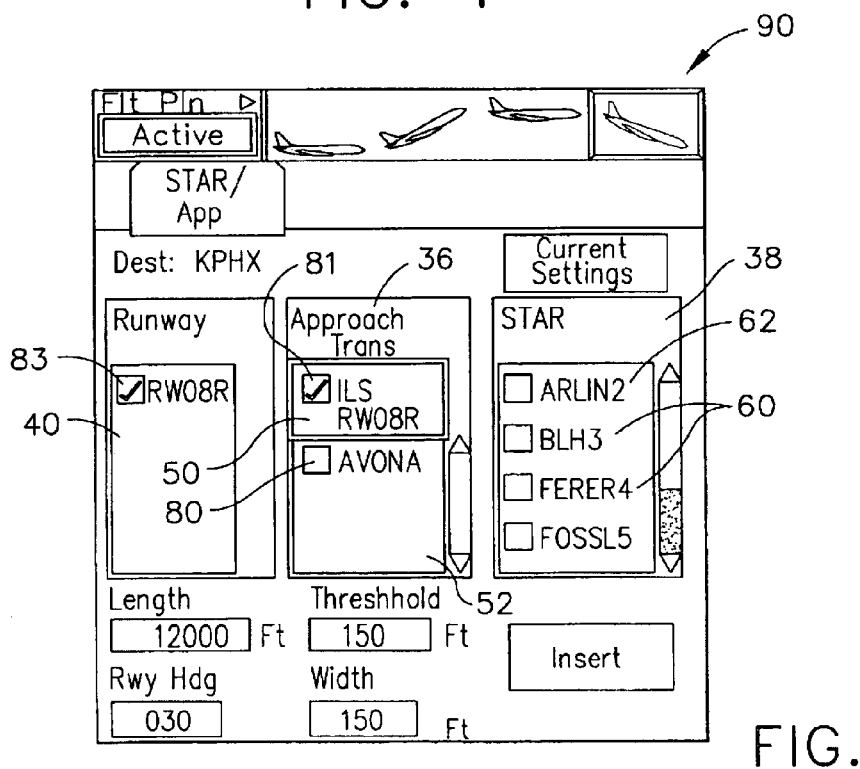

FIG. 4 is an exemplary display image showing selections in planning the arrival phase of an aircraft's flight plan in accordance with an exemplary embodiment of the present invention shown after the selection of a runway; and FIG. 5 is another exemplary display image showing selections in planning the arrival phase of an aircraft's flight plan in accordance with an exemplary embodiment of the present invention shown after the selection of an approach.

DETAILED DESCRIPTION OF EXEMPLARY EMBODIMENTS

Systems, methods and display devices in accordance with various aspects of the present invention facilitate a user's interface with an informational display to more accurately and efficiently select FMS procedures in an avionics system. In that regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Moreover, it should be understood that the exemplary process illustrated may include more or less steps or may be performed in the context of a larger processing scheme. Furthermore, the various schematics, display images, and methods presented in the drawing figures or the specification are not to be construed as limiting the order in which the individual process steps may be performed or the way in which the images relating to the process steps may be displayed.

It should be appreciated that the particular implementations shown and described herein are illustrative of the invention and its best mode and are not intended to otherwise limit the scope of the present invention in any way. Indeed, for the sake of brevity, conventional techniques and components related to aircraft flight instrumentation, liquid crystal displays, image rendering, head up displays (HUD) which require the pilot to intermittently scan various areas of the cockpit to obtain and analyze the aircraft information, image rendering, landing and guidance methodologies, and other functional aspects of the systems (and components of the individual operating components of the systems) may not be described herein in detail. Furthermore, as previously indicated, the FMS display images shown in various figures are illustrative in nature and are not intended to limit the scope or applicability of the present invention in any way.

Figure 1:
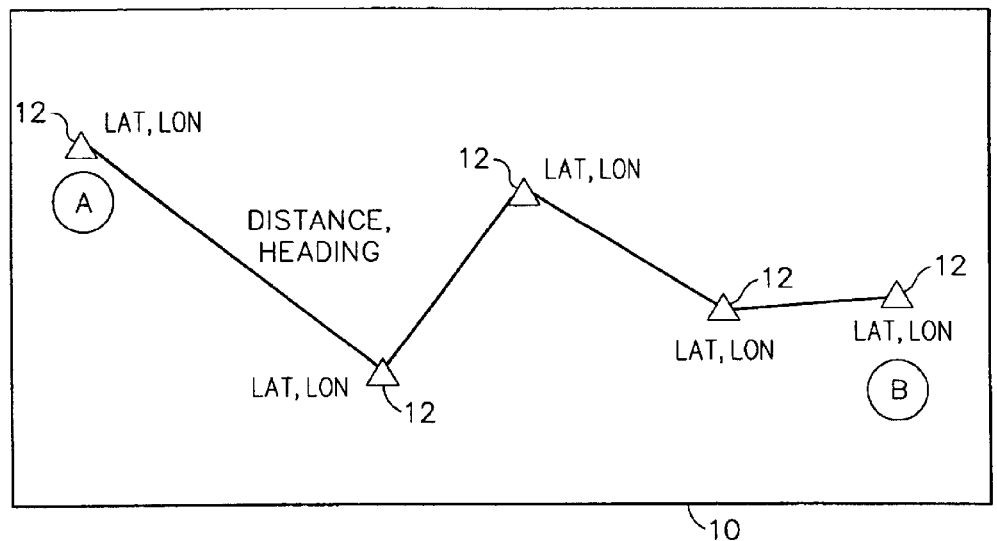
FIG. 1 is a conventional FMS graphic display illustrating various waypoints determining a flight plan from an origination point A to a destination point B, including the various latitude and longitude identifiers with the various waypoints.
Figure 2:
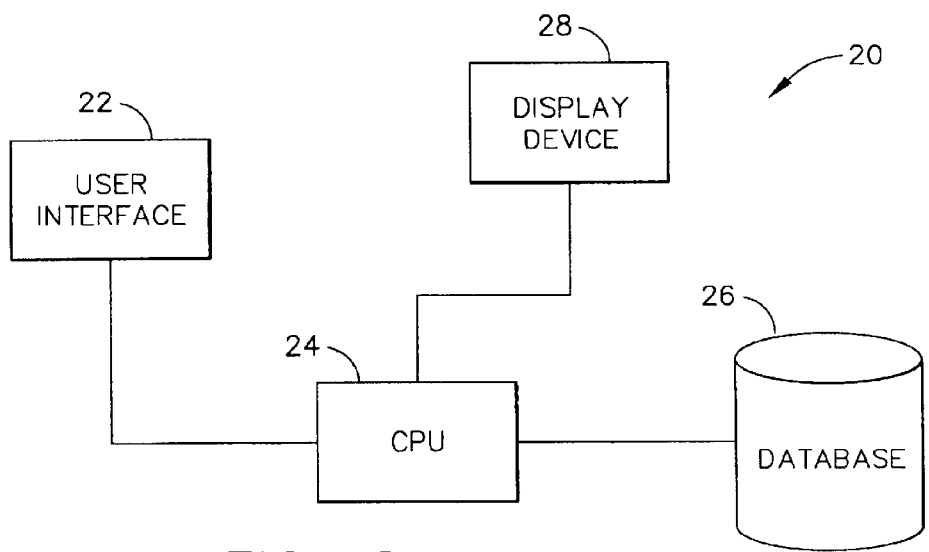
FIG. 2 is a schematic showing the system of the present invention.

Referring now to FIG. 2, an exemplary system of the present invention for selecting and displaying navigational information relating to a phase of flight is shown. Exemplary system 20 includes a user interface 22, a central processing unit (CPU) 24, an avionics data base 26, and a display device 28. In general, a user such as a pilot enters data via user interface 22 which is directed to CPU 24. User interface 22 may comprise a variety of configurations including, but not limited to, a cursor control device, a joystick, a mouse, a track ball, a keyboard, and the like, as long as the configuration is suitable to accept input from a user. One exemplary embodiment of user interface 22 includes a cursor control device having a touch-pad interface device with a thumb actuation switch located on its side. When employing the device, the user rests a hand on a built-in palm rest to stabilize the hand, positions the fingertip for pointing, and positions the thumb for clicking. In an alternate embodiment, user interface 22 may comprise a track ball device which is coupled with one or more keys or pushbuttons that are used to select data captured by the cursor.

CPU 24 may include one or more processors which are used to accept data or information from user interface 22 and process the information or data with information contained in an avionics data base 26 to arrive at information which is displayed on display device 28, CPU 24 may include any number of individual microprocessors, memories, storage devices, interface cards, and other conventional components known in the art.

CPU 24 accesses avionics data base 26 to compare and process data relating to data which was inputted by a user via user interface 22. Avionics data base 26 may include data such as flight plan data, runway data, approach data, transition data, arrival route data, landing data, other data relating to the approach and/or departure of an aircraft, and the like.

Once the data from avionics data base 26 and user interface 22 are processed by CPU 24, the resulting data and/or information is displayed by utilizing display device 28. Display device 28 includes various graphical elements associated with the lateral position, vertical position, flight plan, arrival phase, departure phase, and/or other indicia of an aircraft's operational state as determined from the data in avionics data base 26 and/or data that is input via user interface 22. One skilled in the art will appreciate that the pilot may modify the flight plan, arrival phase, departure phase, and/or other such indicia graphically and/or numerically in accordance with feedback received by CPU 24. Display device 28 may include any display monitor suitable for displaying the various symbols and information detailed herein. Many conventional monitors are suitable for this task, including, for example, various cathode ray tube (CRT), liquid crystal display (LCD), and other electronic flat-panel display systems. In addition to the enhanced features and indicia described in more detail below, display device 28 may include any number of conventional elements, e.g., visual indicators, alphanumeric text, lights, and the like.

In accordance with an exemplary embodiment of the invention, CPU 24 is configured to receive and process information associated with an approach target for the aircraft, e.g., a destination runway. CPU 24 may also be suitably configured to receive and process target and/or bearing data included in avionics data base 26 which relate to an intended destination of the aircraft. In a practical commercial aircraft application, such avionics data may be associated with specific landing coordinates, a runway, a type of approach, an arrival route, or the like. This avionics data may be received by the aircraft via a conventional landing guidance system. As described in more detail below, CPU 24 may process avionics data contained in avionics data base 26 and generate appropriate signals to display device 28 such that display device 28 displays indicia representative of an arrival phase of a flight plan.

Figure 3:
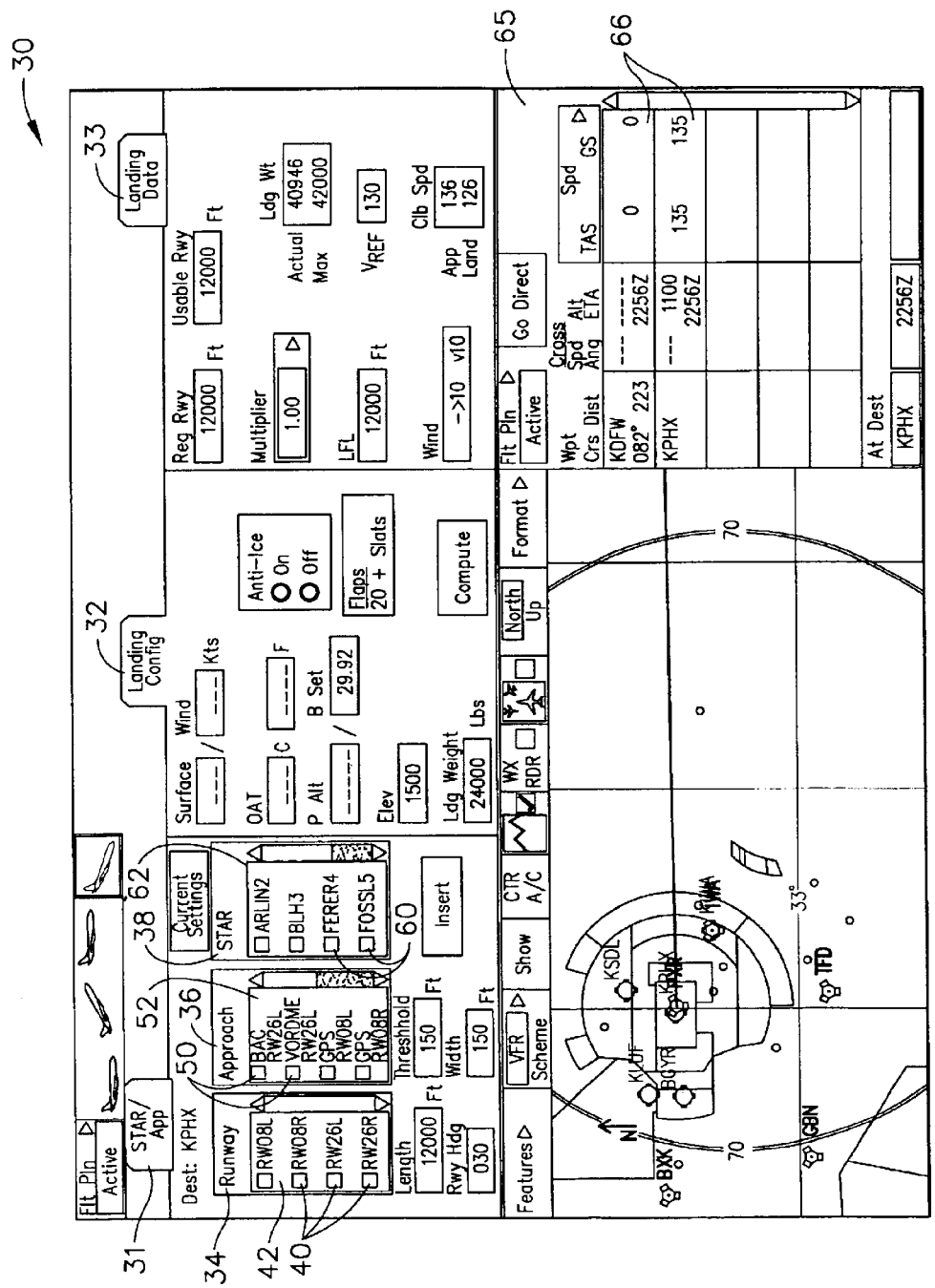
FIG. 3 is a schematic overview of an exemplary FMS display showing both alphanumeric and graphic information.

FIG. 3 shows a schematic overview of an FMS display 30 showing both alphanumeric and graphic information. The FMS display is also known as an FMS window and provides an interface to the pilot for flight plan creation, performance initialization, performance data, procedure selection and review, and takeoff and landing initialization and data. The FMS window can be displayed in a ⅙, ⅓, or ½ window format, as well as a full window format. The FMS display 30 in FIG. 3 is shown in a full window format.

In FMS display 30, various selection tabs 31, 32 and 33 are shown which show information relating to arrival procedure selection, landing configuration, and landing data, respectively. Like the full FMS display, an arrival phase of an FMS display can be displayed in a ⅙, ⅓, or ½ window format, as well as a full window format.

The STAR-approach selection tab 31 allows for the display and selection of various navigational categories and their underlying navigational choices or options.

For example, FIG. 3 shows a runway navigational category 34, an approach navigational category 36, and a STAR navigational category 38. Under runway navigational category 34, there are several runway choices or options 40 contained in a navigational runway option display area 42. Further, approach navigational category 36 includes a navigational approach option display area 52 which contains a plurality of navigational approach options 50, and STAR navigational category 38 includes a navigational STAR option display area 62 which contains a plurality of navigational STAR options 60.

Referring again to FIG. 3, a flight plan display 65 is shown which includes the path of the flight having way points 66. This flight plan display 65 will automatically change to add way points when a phase of arrival is programmed by selecting from the various navigational categories and options displayed in the STAR approach selection tab 31. FMS display 30 also includes a landing configuration tab 32 which is used to select the aircraft landing configuration and a landing data tab 33 which is used to display the FMS computed landing data. With respect to the landing configuration tab 32, defaults are provided for all fields contained within the tab except the fields identifying surface winds and OAT. Further, with respect to the landing data tab 33, the multiplier field is the only field which permits entry of data by the pilot.

Exemplary display images showing selections under the STAR/approach selection tab 31 in planning the arrival phase of an aircraft's flight plan are shown in FIGS. 4 and 5. With respect to FIG. 4, display image 70 is shown after the selection of a navigational runway option 40 in the navigational runway category 34. Once the runway option 40 has been selected, all of the other runway options are removed from the runway option display area 42. Moreover, as a result of the runway selection, a predetermined set of options in one or more other categories, such as approach category 36 and STAR category 38, is automatically presented. These predetermined sets of options are determined based upon the runway that is selected. For example, as shown in FIG. 4, two different approach options 50 are available for selection after selecting the right-hand runway of runway 8 (RW08R) as the runway option. Predetermined result options which automatically appear in one navigational category as a result of a selection in another navigational category allows the pilot to eliminate the task of having to view and assimilate several pages before identifying the options in a navigational category that are available as a result of his previous selection. For example, instead of having to review all of the pages containing the types of approaches that are available for an aircraft after selecting a runway, the pilot can simply view the more limited set of predetermined approach options 50 that are automatically presented in the approach option display area 52.

Scroll bars 72 are included with each navigational category to aid in selecting the particular options contained in that category. The scrollable area includes all available options in a given navigational category which exist as a result of a previously made selection in a navigational category. For example, in FIG. 4, the scroll bar 72 is configured to scroll through all of the approach options that are available to the aircraft as a result of selecting runway RW08R.

FIG. 5 illustrates display image 90 which shows the subsequent selection of a type of approach that can be used on the right-hand runway of runway 8 (or RW08R). In order to make the selection, an approach option 50 is selected by highlighting one of the approach options 50 used for the right-hand runway of runway 8 which are contained in the approach category 36. After the approach option selection is highlighted and programmed, all other approach options remaining in option display area 52 are removed from display area 52 and a predetermined set of transitions that are available as a result of selecting that approach are displayed beneath the selected approach. For example, in FIG. 5, an instrument landing system approach (ILS) for the right-hand runway of runway 8 was selected and entered/programmed. As a result of that selection and entry, all of the other approach options 50 were removed from approach option display area 52 and the resulting transitions 80 available as a result of selecting that approach are listed below the ILS approach option 50. In FIG. 5, the only transition 80 available as a result of selecting the ILS approach 50 is the AVONA transition 80 listed under the ILS approach 50.

This selection process then continues and predetermined sets of options are automatically displayed as a result of previously selected options. For example, in FIG. 5, the AVONA transition 80 may be selected and entered/programmed and that entry would then result in a predetermined set of arrival route options 60 contained in arrival route display area 62 within arrival route category 38. Basically, the arrival route options 60 represent different paths into the airport and, depending upon the type of approach and the direction from which the approach is being made, a transition 80 may or may not be necessary to utilize a particular arrival route 60. As can be seen from FIGS. 4 and 5, the selection of an option may be represented by a box 81 which outlines or highlights the option and the entry or programming of the option may be represented by a check mark 83 placed next to the option.

Although a system, method and device for displaying and selecting navigational information has been described and illustrated with reference to certain illustrative examples, it is not intended that the invention be limited to these illustrative embodiments. Those with skill in the art will recognize that various modifications and alternatives are possible without departing from the spirit of the invention. For example, although reference has been made throughout to "aircraft", it is intended that the invention also be applicable to vehicles that are on the ground. Accordingly, it is intended that the invention include all such modifications and alternatives as fall within the scope of the appended claims.

I claim:

1. A system for selectively displaying an aircraft arrival or departure phase, comprising:

a processor configured to supply one or more display commands; and a display coupled to receive the display commands from the processor and operable, in response thereto, to simultaneously display a plurality of navigational categories and one or more selectable and deselectable navigational choices within each navigational category, wherein the navigational choices displayed in one or more navigational categories change simultaneously as a navigational choice displayed in one or more other navigational categories is selected or deselected.

2. The system of claim 1, wherein:

each navigational category and one or more of its associated navigational choices are simultaneously displayed in separate display areas; and each display area includes a scroll bar configured to selectively display a number of the navigational choices therein.

3. The system of claim 1, wherein the plurality of navigational categories include at least one of a runway, an approach, a departure, a top of descent position, a top of ascent position, a transition, an arrival rout, and a departure route.

4. The system of claim 1, further comprising:

a user interface configured to accept one or more user input commands.

5. The system of claim 4, wherein:

the user input commands include navigation choice selection and deselection commands, whereby a navigational choice may he selected and deselected, respectively;

the processor is further configured to (i) revive the navigational choice selection and deselection commands from the user interface and (ii) supply, in response thereto, navigational choice selection and deselection display commands, respectively; and the display is further operable, in response to the navigational choice selection and deselection display commands, to (i) display a single navigational choice in a navigational category when that single navigational choice is selected using the user interface and (ii) display all the selectable navigational choices in a navigation category when no single navigational choice is deselected using the user interface.

6. The system of claim 1, further comprising:

an avionics database configured to store at least data related to aircraft arrival and departure, wherein the navigational choices displayed within each navigational category are based at least in part on the data stored in the avionics database.

7. The system of claim 6, wherein the stored data includes aircraft arrival and departure data for a plurality of aircraft landing sites.

8. A method of displaying aircraft arrival or departure phase information, comprising:

simultaneously displaying a plurality of navigational categories, and one or more selectable and deselectable navigational choices within each navigational category, on a single display screen; and simultaneously changing the navigational choices displayed in one or more navigational categories when a navigational choice displayed in one or more other navigational categories is selected or deselected.

9. The method of claim 8, further comprising:

simultaneously displaying each navigational category and one or more of its associated navigational choices in separate display areas on the display screen; and associating a scroll bar with each display area that is configured to selectively display a number of the navigational choices therein.

10. The method of claim 8, wherein the plurality of navigational categories include at least one of a runway, an approach, a departure, a top of descent position, a top of accent position, a transition, an arrival rout, and a departure route.

11. The method of claim 8, wherein the navigational choices displayed within each navigational category are based at least in part on stored aircraft arrival and departure data.

12. The method of claim 11, wherein the stored aircraft arrival and departure data includes such data for a plurality of aircraft landing sites.

13. The method of claim 8, further comprising:

displaying a single navigational choice in a navigational category when that single navigational choice is selected; and displaying all the selectable navigational choices in a navigation category when no single navigational choice is deselected.

14. A system for selecting and displaying flight management system (FMS) procedures, comprising:

a user interface configured to accept one or more user input commands;

a processor coupled to the user interface and responsive thereto, to supply one or more display commands; and a display coupled to receive the display commands from the processor and operable, in response thereto, to simultaneously display a plurality of navigational categories and one or more selectable and deselectable navigational choices within each navigational category, wherein the navigational choices displayed in one or more navigational categories change simultaneously as a navigational choice displayed in one or more other navigational categories is selected or deselected.

15. The system of claim 14, wherein:

each navigational category and one or more of its associated navigational choices are simultaneously displayed in separate display areas; and each display area includes a scroll bar configured to selectively display a number of the navigational choices therein.

16. The system of claim 14, wherein:

the user input commands include navigation choice selection and deselection commands, whereby a navigational choice may be selected and deselected, respectively; and the display is further operable, in response to the navigational choice selection and deselection display commands, to (i) display a single navigational choice in a navigational category when that single navigational choice is selected using the user interface and (ii) display all the selectable navigational choices in a navigation category when no single navigational choice is deselected using the user interface.

17. The system of claim 14, further comprising:

an avionics database configured to store at least data related to aircraft arrival and departure, wherein the navigational choices displayed within each navigational category are based at least in part on the data stored in the avionics database.

* * * * *